United States Patent
Leonard et al.

(10) Patent No.: US 11,079,758 B2
(45) Date of Patent: Aug. 3, 2021

(54) SYSTEMS AND METHODS FOR INCENTIVIZING USER-AIDED IMPROVEMENT OF AUTONOMOUS VEHICLE CONTROL SYSTEMS AND METHODS OF OPERATING A VEHICLE USING THE SAME

(71) Applicant: Toyota Research Institute, Inc., Los Altos, CA (US)

(72) Inventors: John J. Leonard, Cambridge, MA (US); Simon A. I. Stent, Cambridge, MA (US); Luke S. Fletcher, Cambridge, MA (US); Stephen G. McGill, Broomall, PA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 574 days.

(21) Appl. No.: 15/870,027

(22) Filed: Jan. 12, 2018

(65) Prior Publication Data
US 2019/0220010 A1 Jul. 18, 2019

(51) Int. Cl.
*G05D 1/00* (2006.01)
*B60W 50/14* (2020.01)

(52) U.S. Cl.
CPC ........... *G05D 1/0088* (2013.01); *B60W 50/14* (2013.01); *B60W 2050/146* (2013.01)

(58) Field of Classification Search
CPC ................ G05D 1/0088; B60W 50/14; B60W 2050/146
See application file for complete search history.

(56) References Cited

U.S. PATENT DOCUMENTS

| | | | |
|---|---|---|---|
| 7,421,334 B2* | 9/2008 | Dahlgren | G07C 5/008 340/989 |
| 8,989,954 B1* | 3/2015 | Addepalli | H04W 72/0406 701/32.3 |
| 9,201,421 B1 | 12/2015 | Fairfield et al. | |
| 9,262,914 B2 | 2/2016 | Purushothaman et al. | |
| 9,704,396 B1* | 7/2017 | Owens | G08G 1/0965 |
| 9,958,870 B1* | 5/2018 | Graybill | G05D 1/00 |
| 2014/0222323 A1* | 8/2014 | Purushothaman | H04L 67/22 701/117 |
| 2018/0365740 A1* | 12/2018 | Nix | B60W 50/08 |
| 2019/0168748 A1* | 6/2019 | Kroop | G05D 1/0022 |
| 2020/0004241 A1* | 1/2020 | Levinson | G05D 1/0027 |
| 2020/0033877 A1* | 1/2020 | Ferguson | G06K 9/00805 |

FOREIGN PATENT DOCUMENTS

| | | |
|---|---|---|
| CN | 106097716 A | 11/2016 |
| KR | 20130141102 A | 12/2013 |

OTHER PUBLICATIONS

Shibina et al., Ensuring trust worthiness of images on vehicular cloud, International journal of computational intelligence research ISSN 0973-1873 vol. 12, No. 2 (2016), pp. 215-218.

* cited by examiner

*Primary Examiner* — Thomas Ingram
(74) *Attorney, Agent, or Firm* — Dinsmore & Shohl LLP

(57) ABSTRACT

A method of collecting data regarding the operation of a vehicle that includes receiving sensor data regarding one or more objects or events in a surrounding environment using one or more vehicle sensors, classifying, by one or more processors, the one or more detected objects or events, generating one or more vehicle inquiries based on the classification of the one or more detected objects or events, presenting one or more vehicle inquiries, and receiving user feedback to the one or more vehicle inquiries.

15 Claims, 5 Drawing Sheets

SYSTEMS AND METHODS FOR INCENTIVIZING USER-AIDED IMPROVEMENT OF AUTONOMOUS VEHICLE CONTROL SYSTEMS AND METHODS OF OPERATING A VEHICLE USING THE SAME

TECHNICAL FIELD

The present specification generally relates to autonomous vehicle control systems and, more specifically, systems and methods for incentivizing user feedback to improve autonomous vehicle control.

BACKGROUND

Vehicles may be capable of driving either completely autonomously or semi autonomously, and may monitor and store data regarding the vehicle operating environment in which the vehicle operates. Autonomous vehicles may have sensors for detecting and classifying objects or events in the environment. The classification of objects or events may affect the actions of the autonomous vehicle. However, autonomous vehicles may misclassify objects or events, particularly when sensor data is low quality for any reason. For example, an autonomous vehicle's sensor system may detect what is actually a school bus and classify it as a large truck. Additionally, autonomous vehicles may perform actions or maneuvers in a manner that is unpleasant to the driver and/or passenger.

SUMMARY

In one embodiment, method of collecting data regarding the operation of a vehicle includes receiving sensor data regarding one or more objects or events in a surrounding environment using one or more vehicle sensors, classifying, by one or more processors, the one or more detected objects or events, generating one or more vehicle inquiries based on the classification of the one or more detected objects or events, presenting one or more vehicle inquiries, and receiving user feedback to the one or more vehicle inquiries.

In another embodiment, an autonomous vehicle control system includes one or more processors, one or more non-transitory memory modules communicatively coupled to the one or more processors, one or more vehicle sensors, one or more feedback devices, and machine readable instructions stored in the one or more non-transitory memory modules that cause the autonomous vehicle control system to perform at least the following when executed by the one or more processors: detect one or more objects or events in a surrounding environment using sensor data from one or more vehicle sensors, classify the one or more detected objects, generate one or more vehicle inquiries based on the classification of the one or more detected objects or events, present the vehicle inquiries using the one or more feedback devices, and receive user feedback to the vehicle inquiries using the one or more feedback devices.

In yet another embodiment, a method of controlling a vehicle includes controlling the vehicle, using one or more processors, to perform an autonomous action, receiving sensor data from one or more vehicle sensors surrounding the autonomous action, developing one or more vehicle inquiries based on the autonomous action and the sensor data surrounding the autonomous action, presenting the one or more vehicle inquiries and receiving user feedback to the one or more vehicle inquiries.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
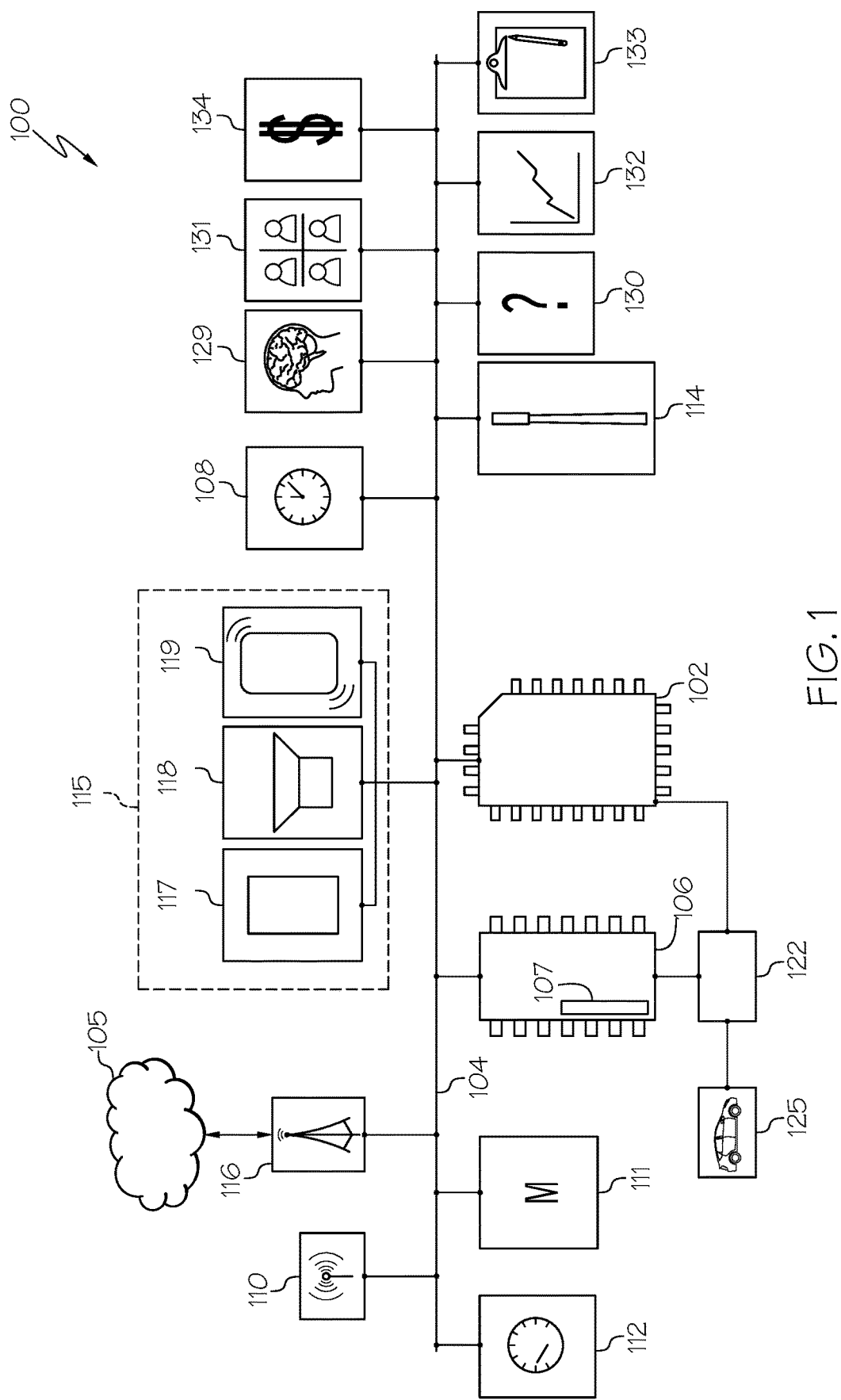
FIG. 1 schematically depicts an autonomous vehicle control system, according to one or more embodiments shown and described herein.

Embodiments of the present disclosure are directed to autonomous vehicles, systems, and methods for generating and presenting vehicle inquiries regarding autonomous functionalities of vehicles to users to improve said autonomous functionalities. Autonomous functionalities include, but are not limited to, the performance of autonomous maneuvers (e.g., lane keeping assist, parking assist, fully autonomous control,) or the classification of objects using sensor data. Embodiments described herein may be utilized in autonomous or semi-autonomous vehicles (e.g., vehicles having Level 1 to Level 5 autonomy). Autonomous or semi-autonomous vehicles rely on systems including environmental sensors to accurately detect objects and events in the environment to perform the desired autonomous functionalities. However, these systems may misidentify objects or events in the surrounding environment for a variety of reasons. For example, environmental conditions (e.g., low light, occluding objects) may prevent the vehicle from receiving sensor data having a high enough quality to accurately classify or otherwise determine an object or event. As another example, machine learning and/or object recognition algorithms may not have the requisite historical data to properly classify new objects discovered within the environment. For many reasons, the vehicle may detect objects with a low confidence level and in some cases may misidentify an object. Misidentification of objects or events may result in improper vehicle operation.

Embodiments of the present disclosure use input from the one or more users of the vehicle (i.e., passengers) to assist autonomous vehicle systems in accurately identifying and classifying objects and/or events in the environment. Improved classification of objects and/or events may lead to improved autonomous functionality of the vehicle. Particularly, the better the vehicle may detect and classify objects and/or events, the better the vehicle may perform autonomous actions. This human-computer interaction may be referred to as human-in-the-loop machine learning. Particularly, embodiments present vehicle inquiries that as the one or more users to provide feedback, such as verification of detected objects or events. Embodiments solicit feedback from one or more users regarding performance of autonomous actions to determine preferences of the user with respect to autonomous control of the vehicle. In some embodiments, the sensor data of vehicle sensors surrounding the feedback may be associated with the feedback. For example, sensor data received a certain amount of time before receiving feedback and sensor data received a certain amount of time after receiving feedback may be aggregated with the feedback and utilized to improve object and/or event classification.

Moreover, soliciting the assistance of the vehicle's passengers may be more successful if the passengers are incentivized to interact with the vehicle's systems and respond to generated inquiries. Embodiments of the present disclosure provide incentives for providing feedback in response to vehicle inquiries. Incentivizing responses may result in a larger number of responses being submitted and further, more apt responses, thereby improving autonomous vehicle functionality more quickly. In another aspect, responses may be associated with sensor data at the time an inquiry was presented or a response proffered, enabling coincident analysis of the sensing data regarding the object or event and the user's reaction or response. This real-time data and associated response may be aggregated across a plurality of autonomous vehicles to inform user preferences, allowing manufacturers of autonomous vehicles to best serve customer demand.

Example components of an example autonomous vehicle control system are described below followed by example methods for soliciting and receiving feedback in response to vehicle inquiries for improving autonomous functionalities of a vehicle.

Referring now to FIG. 1, an embodiment of an autonomous vehicle control system 100 for a vehicle 10 (FIG. 2) is schematically depicted. The vehicle 10 may be an autonomous automobile or a semi-autonomous automobile or other passenger vehicle. The vehicle 10 comprises a frame, one or more wheels, and a plurality of vehicular systems 125 such as, without limitation, a transmission system, a throttle system, a braking system, an autonomous driving system, a lane-keeping assist system, a parking assist system, a steering system, a navigation system, an infotainment system, and the like. While the autonomous vehicle control system 100 is depicted in isolation, some or all of the components of the autonomous vehicle control system 100 may be included within the vehicle 10.

An automated drive controller 122 may be communicatively coupled to the plurality of vehicular systems 125. In operation, the automated drive controller 122 provides one or more vehicle control signals to the plurality of vehicular systems 125 to control the acceleration, speed, and/or direction of travel of the vehicle 10 by controlling one or more systems of the plurality of vehicular systems 125, such as the engine system, steering system, transmission system, braking system, or the like. In some embodiments, the automated drive controller 122 is a component of the vehicle 10 and in other embodiments the automated drive controller 122 is positioned apart from the vehicle 10 and is communicatively coupled to the plurality of vehicular systems 125 of the vehicle 10 using a wireless connection. Further, the automated drive controller 122 may be communicatively coupled to one or more processors 102 and one or more non-transitory memory modules 106. In some embodiments, the automated drive controller 122 includes at least one of the one or more processors 102 and at least one of the one or more non-transitory memory modules 106. In operation, the automated drive controller 122 may output one or more vehicle control signals to the plurality of vehicular systems 125. As a non-limiting example, the one or more vehicle control signals of the automated drive controller 122 may comprise an acceleration control signal which includes instructions regarding a desired acceleration rate of the vehicle 10 and a deceleration control signal which includes instructions regarding a desired deceleration rate of the vehicle 10. Additionally, although the automated driver controller 122 and the one or more processors 102 are illustrated as separate components, these two components may share functionality and/or be the same component. Thus, the one or more processors 102 may be components of the automated drive controller 122. Alternatively, in some embodiments the automated drive controller 122 and/or the one or more processors 102 may comprise one or more electronic control units (ECU) and/or one or more software modules.

Each of the one or more processors 102 may be any device capable of executing machine readable instructions. Accordingly, each of the one or more processors 102 may be a controller, an integrated circuit, a microchip, a computer, an application specific integrated circuit, and the like. The one or more processors 102 are coupled to a communication path 104 that provides signal interconnectivity between various components of the autonomous vehicle control system 100. Accordingly, the communication path 104 may communicatively couple any number of processors 102 with one another, and allow the components coupled to the communication path 104 to operate in a distributed computing environment. As used herein, the term "communicatively coupled" means that coupled components are capable of exchanging data or power signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Additionally, the one or more non-transitory memory modules 106 may be coupled to the communication path 104. The one or more non-transitory memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more non-transitory memory modules 106. Alternatively, the machine readable instructions may be written in a hardware description language (HDL), such as logic implemented via either a field-programmable gate array (FPGA) configuration or an application-specific integrated circuit, or their equivalents. The machine readable instructions may be used to perform one or more of the feedback and incentive functions described below. Accordingly, the methods described herein may be implemented in any conventional computer programming language, as pre-programmed hardware elements, or as a combination of hardware and software components.

The autonomous vehicle control system 100 may further comprise a location device 114, such as a satellite antenna, coupled to the communication path 104 and configured to locate the vehicle 10, for example, by receiving signals from global positioning system satellites. For example, the location device 114 may include one or more conductive elements that interact with electromagnetic signals transmitted by global positioning system satellites. The received signal is transformed into a data signal indicative of the location of the location device 114 or an object positioned near the location device 114, by the one or more processors 102. In other embodiments, the location device 114 may comprise electro-optic sensors, infrared sensors, RF sensors, imaging sensors, or the like. For example the location device 114 may locate the vehicle 10 using control plane locating, by tracking one or more mobile devices of the driver, or any other known or yet to be developed method of locating a vehicle. Further, in embodiments in which the vehicle 10 is located using a mobile device of the driver, this mobile device may be the "location device 114." As used herein, "location" means a unique geographic coordinate defined with reference to a coordinate system, such as a geographic location defined by a particular latitude and longitude. Further, in embodiments where the location device 114 comprises a satellite antenna coupled to the vehicle 10, the one or more processors 102 execute machine readable instructions to transform the global positioning satellite signals received by the satellite antenna into data indicative of the current location of the vehicle 10.

Moreover, the autonomous vehicle control system 100 may comprise a clock 108 coupled to the communication path 104. The clock 108 may provide time of day signals and calendar signals (e.g., month/day/year data, day of the week data, holiday data, or the like) to the processors 102 and other components of the autonomous vehicle control system 100. As described below, the autonomous vehicle control system 100 may operate differently on different days, and/or at different times of a day.

In some embodiments, the autonomous vehicle control system 100 communicates with a network 105, for example, one or more computer networks (e.g., a personal area network, a local area network, or a wide area network), cellular networks, satellite networks, cloud networks, and/or a global positioning system and combinations thereof. Example local area networks may include wired Ethernet and/or wireless technologies such as, for example, wireless fidelity (Wi-Fi). Moreover, example personal area networks may include wireless technologies such as, for example, IrDA, Bluetooth, Wireless USB, Z-Wave, ZigBee, and/or other near field communication protocols, and/or wired computer buses such as, for example, USB and FireWire. Suitable cellular networks include, but are not limited to, technologies such as LTE, WiMAX, UMTS, CDMA, and GSM.

The autonomous vehicle control system 100 comprises network interface hardware 116 for communicatively coupling the autonomous vehicle control system 100 to the network 105. The network interface hardware 116 can be communicatively coupled to the communication path 104 and can be any device capable of transmitting and/or receiving data via a network. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware, hardware configured to operate in accordance with the Bluetooth wireless communication protocol, and/or any wired or wireless hardware for communicating with other networks and/or devices.

The network 105 may also perform other functions. As a non-limiting example, the network interface hardware 116 may transmit voice data representing oral responses of the user to the network 105. The network 105 may then use one or more voice recognition and natural language processing algorithms to translate the voice data into instructions. The network 105 may then act on the instruction to perform one or more of the operations described herein.

Figure 2:
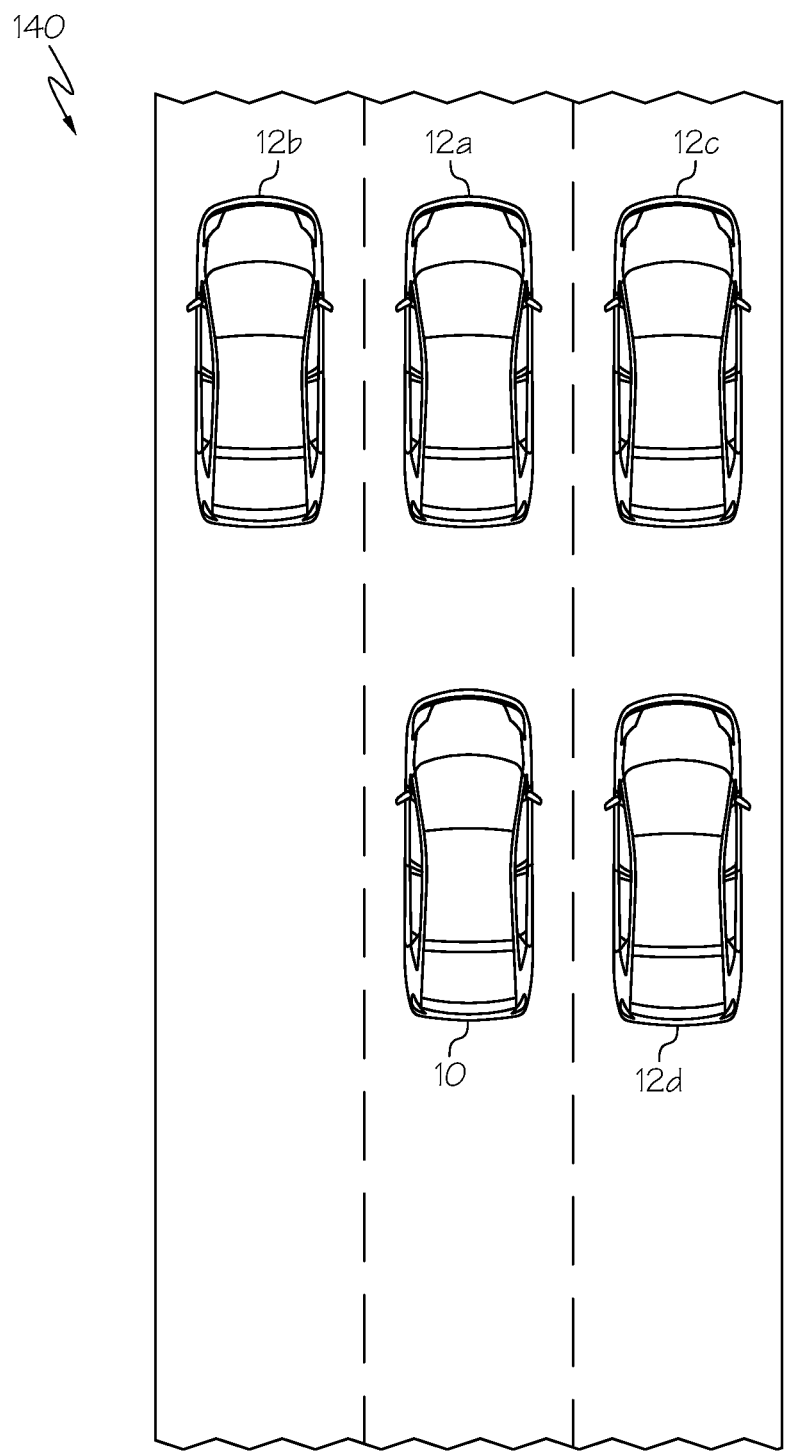
FIG. 2 schematically depicts an example vehicle operating environment including a vehicle surrounded by a plurality of target vehicles, according to one or more embodiments shown and described herein.

The autonomous vehicle control system 100 further comprises one or more observation sensors 110 coupled to the vehicle 10 and communicatively coupled to the communication path 104. The one or more observation sensors 110 may comprise any sensor or combination of sensors configured to monitor a surrounding environment 140 (FIG. 2). The observation sensors 110 may also monitor the vehicle 10 and occupants of the vehicle 10 (such as the driver of the vehicle 10) and may output sensor signals regarding the vehicle 10 and the occupants of the vehicle 10. In operation, the observation sensors 110 may assist the vehicle 10 in navigating autonomously and in learning additional information regarding the surrounding environment 140.

The one or more observation sensors 110 may include proximity sensors, cameras, laser scanners, capacitive displacement sensors, Doppler Effect sensors, eddy-current sensors, ultrasonic sensors, magnetic sensors, optical sensors, radar sensors, sonar sensors, lidar sensors, vibration sensors, or combinations thereof. For example, the one or more observation sensors 110 may detect and output sensor signals regarding vehicles or other objects in the surrounding environment 140 (e.g., objects on a road's shoulder), the condition of the surrounding environment 140, events occurring and having occurred in the surrounding environment 140, and the one or more users within the vehicle 10 (e.g., gaze tracking cameras). Further, the autonomous vehicle control system 100 may include one or more moisture sensors 111 coupled to the vehicle 10 and communicatively coupled to the communication path 104. The one or more moisture sensors 111 may be configured to determine the presence of moisture, which may assist the autonomous vehicle control system 100 determine the present weather condition (e.g., determine whether it is raining).

The autonomous vehicle control system 100 further comprises one or more internal sensors 112 coupled to the vehicle 10 and communicatively coupled to the communication path 104. The one or more internal sensors 112 may comprise any sensor or combination of sensors configured to monitor the internal operations of the vehicle 10. In operation, the internal sensors 112 may help the vehicle 10 navigate autonomously and may assist the vehicle 10 learn additional information. The one or more internal sensors may include speedometers, pitot tubes, pressure sensors, proximity sensors, cameras, laser scanners, capacitive displacement sensors, Doppler effect sensors, eddy-current sensors, ultrasonic sensors, magnetic sensors, optical sensors, radar sensors, sonar sensors, lidar sensors, vibration sensors, or combinations thereof.

The one or more internal sensors 112 may be used to measure one or more performance parameters of the vehicle 10 which can be compared to one or more performance criteria to generate measured performance data which may be used by other components of the autonomous vehicle control system 100 as will be described in greater detail below.

Referring still to FIG. 1, the autonomous vehicle control system 100 may further comprise one or more feedback devices 115 communicatively coupled to the communication path 104 and the one or more processors 102. The one or more feedback devices 115 may comprise any device configured to provide feedback to one or more users of the vehicle 10, for example, the driver of the vehicle 10. The one or more feedback devices 115 may comprise one or more of a visual feedback device 117 configured to provide visual feedback, an audible feedback device 118 configured to provide audible feedback, and/or a tactile feedback device 119 configured to provide tactile and/or haptic feedback.

The visual feedback device 117 may comprise any device configured to provide and/or receive visual feedback. For example, the visual feedback device 117 may comprise a display, for example, the display portion of a human machine interface (HMI) of the vehicle 10, such as an infotainment interface, and in operation, the display may provide maps, navigation, entertainment, autonomous operation information, or a combination thereof. The visual feedback device 117 may include any medium capable of transmitting an optical output such as, for example, light emitting diodes, a liquid crystal display, a plasma display, a heads-up display or the like. Moreover, the visual feedback device 117 may be a touchscreen that, in addition to providing optical information, detects the presence and location of a tactile input upon a surface of or adjacent to the surface of the visual feedback device 117. Further, the visual feedback device 117 may comprise one or a combination of lights, for example, lights positioned on a dashboard of the vehicle 10, and may provide visual feedback by displaying different colors, flashing sequences, letter or number displays, or the like. Some embodiments may not include the visual feedback device 117 and some embodiments may include multiple visual feedback devices 117. The visual feedback device 117 may be configured to utilize one or more observation sensors 110 to observe and process data associated with the gestures, posture, or other visual indications of the driver or other users of the vehicle 10, such as eye movement and gaze detection, eye lid position (e.g., drowsiness detection), or other visual user cues.

The audible feedback device 118 may comprise any device configured to provide and/or receive audible feedback and may be positioned in the vehicle 10. The audible feedback device 118 transforms data signals from the one or more processors 102 into audible signals, such as for asking a natural language question to a user of the vehicle 10, and vice versa. In some embodiments, the audible feedback device 118 may be configured as speakers capable of receiving auditory signals from the processor 102 (either directly or indirectly from other hardware, such as amplifiers, drivers, digital-to-analog converters, and the like) to produce auditory messages capable of being heard by one or more occupants of the vehicle 10, for example, the driver. In some embodiments, the audible feedback device 118 includes a first speaker and a second speaker so that the auditory message is provided in stereo. For example, the audible feedback devices 118 may comprise the one or more speakers of a speaker system of the vehicle 10. In some embodiments, the audible feedback device 118 may comprise headphones, earbuds, or the like. Further, some embodiments may not include the audible feedback device 118 and some embodiments may include multiple audible feedback devices 118. The audible feedback device 118 may include one or more microphones for receiving an audible input.

The tactile feedback device 119 may comprise any device configured to provide and/or receive tactile and/or haptic feedback. The tactile feedback device 119 may be positioned in the vehicle 10 in a variety of locations such that tactile and/or haptic feedback output by the tactile feedback device may be perceptible to one or more occupants of the vehicle 10, such as the driver. For example, the tactile feedback device 119 may be positioned on or in one or more seats of the vehicle 10, such as a driver's seat, on or in a steering wheel, and one or in the floor, dashboard, seat belt, or any other location from which the tactile feedback device 119 may output perceptible tactile and/or haptic feedback. The tactile feedback device 119 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may utilize tactile feedback to prompt a driver and/or other user of the vehicle 10 to answer a question regarding an object or event detected in the surrounding environment. Some embodiments may not include a tactile feedback device 119 and some embodiments may include multiple tactile feedback devices 119.

The one or more feedback devices 115 or other components of the autonomous vehicle control system 100 may be used to generate one or more vehicle inquiries to present to the user of the vehicle. As used herein, "vehicle inquiry" or "vehicle inquiries" refers to any request or prompt generated by the autonomous vehicle control system that the driver understands as a request or prompt to provide feedback or information. In one non-limiting embodiment, the vehicle inquiries may be presented as natural language inquiries as described in more detail below. For example, the vehicle 10 may use the one or more feedback devices 115 to verbally ask the user to provide feedback regarding autonomous vehicle functionalities performed by the vehicle 10. The vehicle inquiries may regard a relationship between the perceived sensor data and the measured performance data. Measured performance data is data regarding the operation of the vehicle such as speed, acceleration, turn angle, location, and the like. The autonomous vehicle control system 100 may present the vehicle inquiries to the one or more users of the vehicle. The one or more feedback devices 115 may also be used to receive user feedback to the one or more vehicle inquiries.

The autonomous vehicle control system 100 may comprise an information database 107 comprising data for performing operation of the vehicle 10. The information database 107 may be a dynamic database that stores information (e.g., object or event information, geographical information, and operating condition information) based on sensor data received from the one or more observation sensors 110 and other components of the autonomous vehicle control system 100. The database 107 may be local or remote to the vehicle 10. In operation, the one or more observation sensors 110 may monitor the surrounding environment 140 as the vehicle 10 travels along, and may output sensor signals data to provide roadway information to the one or more non-transitory memory modules 106, such that this additional roadway information may be stored in the information database 107. This additional stored roadway information may increase the confidence score associated with detecting or otherwise evaluating the surrounding environment 140 and/or performing autonomous functionalities. In other words, as the autonomous vehicle control system 100 learns more about the surrounding environment 140, the confidence score associated with the particular objects in the surrounding environment increases.

The autonomous vehicle control system 100 may comprise a recognition module 129. The recognition module 129 may include instructions stored in the one or more non-transitory memory modules 106 and may utilize one or more systems of the autonomous vehicle control system 100, such as the observation sensors 110, to detect and classify an event or object in the surrounding environment. The recognition module 129 may classify an event or object in the surrounding environment based upon one or more attributes of the event or object. Further, the recognition module 129 may assign a confidence level to the classification of the object or event detected.

Any known or yet-to-be-developed object or event recognition algorithms may be utilized to detect objects or events within the sensor data representing the surrounding environment 140. Example object or event recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like. It should be understood that the phrase "object or event recognition algorithm" as used herein also includes facial recognition algorithms used to detect people present within image data.

In some cases, object or event recognition algorithms may not be accurate and may misclassify objects for a variety of reasons, for example, in low ambient lighting conditions, when the pose of an object in the environment is occluded or not as expected, when the similarity between two different objects in close proximity is high, and the like. Object or event recognition algorithms of the present disclosure may produce a confidence level with respect to the objects or events that are detected from the sensor data. The confidence level represents a degree of confidence regarding whether or not the object or event in the surrounding environment 140 is the type of object or event determined from the sensor data. The confidence level may range from a minimum value (i.e., lowest confidence) to a maximum value (i.e., highest confidence). Low confidence levels are produced when the object recognition cannot determine the proper classification of the detected object with high confidence. Conversely, when the object recognition is sure of the classification of the detected object, it produces a high confidence level. In some embodiments, the confidence level is a percentage ranging from 0% as the minimum value to 100% as the maximum value. In other embodiments, the confidence level may not be in the form of a percentage, but rather a number on a predetermined scale (e.g., 0 to 1.0, 0 to 20, 0 to 100 and the like). In embodiments, the automated vehicle control system 100 may present a vehicle inquiry to the one or more passengers when the confidence level is below a certain threshold.

Additionally, the autonomous vehicle control system 100 may comprise an inquiry generation module 130. The inquiry generation module 130 may utilize data generated by the observation sensors 110 regarding one or more objects or events in the surrounding environment to generate one or more vehicle inquiries regarding, for example, the autonomous performance of the vehicle. The vehicle inquiries may be presented audibly or visually. In some circumstances, the vehicle inquiries may be presented haptically (e.g., in the case of a blind and/or deaf user of the vehicle 10). The inquiry generation module 130 may utilize user-generated or user-specific criteria to develop and present the one or more vehicle inquiries. The likelihood that the autonomous vehicle control system 100 will present an inquiry to a user and the depth of that inquiry is partially based on the confidence level assigned to an object or event. In general, the less confident the autonomous vehicle control system is of the identity of an object or event, the more in depth an inquiry the autonomous vehicle control system 100 may present. As a non-limiting example, the autonomous vehicle control system 100 may present a series of inquiries that gradually increase in intricacy as the confidence level increases.

The recognition module 129, the inquiry generation module 130, and/or one or more other components of the autonomous vehicle control system 100 may utilize one or more methods of machine learning to detect and classify objects and autonomously control the vehicle, as well as to required user feedback. Machine learning techniques are not limited by this disclosure. Example machine learning techniques include supervised learning, unsupervised learning, semi-supervised learning, human-in-the-loop learning, reinforcement learning, cluster analysis, hierarchical clustering, anomaly detection, and deep learning. As described in more detail below, the recognition module 129 and the inquiry generation module 130 may utilize human-in-the-loop algorithms to help identify or label events or objects in the surrounding environment or to help correct errors in identifications or labels of events or objects in the surrounding environment to improve autonomous functionality of vehicles.

Additionally, the autonomous vehicle control system 100 may comprise an autonomous control preference module 131. One or more functions of the autonomous control preference module 131 may be performed by the autonomous vehicle control system 100 or be sent from the vehicle using the network interface hardware 116 to be processed and/or manipulated externally. The autonomous control preference module 131 may comprise one or more autonomous operation profiles containing data related to user preferences for controlling various facets of the autonomous vehicle control system 100. As described in more detail below, vehicle inquiries may be presented to solicit feedback from a user to determine the preferences of the user, which may be stored in one or more profiles.

The autonomous operation profiles may include information such as preferred seat locations, preferred acceleration and deceleration profiles, preferred velocity profiles, preferred visual and audio settings, preferred routes, preferred climate control settings, and other various preferred settings, attributes, or behaviors of the autonomous vehicle. The autonomous control preference module 131 may automatically rank the autonomous operation profiles of the vehicle 10 to determine which performance preferences to use to operate the vehicle 10 when multiple users are detected or otherwise within the vehicle 10. Alternatively, the autonomous vehicle control system 100 may provide for manual ranking by the one or more users. The autonomous control preference module 131 may store a default profile based upon default preferences. Default preferences may be determined as the most-preferred, average, or median settings of all users of an individual or the collective of a plurality of autonomous vehicles and be updated periodically as user preferences, safety protocols, or other external factors change.

The autonomous vehicle control system 100 may comprise an autonomous control improvement module 132. The autonomous control improvement module 132 may compare data compiled or generated by the recognition module 129, the inquiry generation module 130, the autonomous control preference module 131 or other components of the autonomous vehicle control system 100 to improve the functionality of the vehicle 10 (e.g., autonomous functionality). The autonomous control preference module 131 may improve the functionality of the vehicle 10 by comparing measured performance data with user feedback and/or other factors to determine calculated performance data. Calculated performance data for the vehicle 10 may be compared to calculated performance data of other vehicles and/or users of the vehicle 10 or other vehicles to improve the performance of the vehicle 10 and or other vehicles.

The reporting module 133 may compile and report information or data detected by the observation sensors, measured by the internal sensors of the vehicle 10, and received from the one or more users as user feedback. The reporting module 133 may send data from the autonomous vehicle control system 100 via the communication path 104 to the network interface hardware 116 and to an external network, such as the network 105.

The incentives module 134 may reward incentives to users of the vehicle 10 for providing user feedback such as answering vehicle inquiries regarding objects or events in the surrounding environment or performing one or more other tasks. In some embodiments, the feedback provider may be awarded a cash payment or a credit toward the use of one or more services. For example, a user may be offered a service credit at a dealership for an oil change for answering one or more vehicle inquiries. As another non-limiting example of ways to incentivize user feedback, feedback providers may be paid in a crypto-currency, such as, for example, Bitcoin or Ethereum. In some embodiments, the feedback provider may be awarded "points" or other type of credit that accrues until it can be exchanged for something of value. In some embodiments, the incentives module 134 may have access to a feedback provider's social media accounts and be permitted to post to the feedback providers feed that the feedback provider has provided feedback. The incentives module 134 may be local to or remote from the vehicle 10.

In some embodiments, the incentives module 134 may present the one or more users with a marketplace of tasks. In such a marketplace, it may be possible for each task to be associated with a distinct reward. The value of a reward may be tied to the relative difficulty of a particular task or the probability that the particular task may be taken on by an individual. For example, in some embodiments, a user may identify objects passively in the environment. In a separate embodiment, a user may actively seek out particular objects or events based on tasking described in the marketplace. As one non-limiting example, one task may describe driving to a particular intersection and identifying objects or events at that intersection, such as road names, traffic patterns, or common driving behaviors at that intersection. In some embodiments, the user may provide unsolicited feedback to the vehicle 10 without first receiving a vehicle inquiry from the vehicle.

The tasks may be presented to a user by various means. For example, the tasks may appear in an in-car app on an in-car video screen or dashboard. Additional non-limiting examples include logging into an online or mobile app to be presented with and/or accept various tasks. As another non-limiting example, the user may receive tasks through a natural language inquiry over the vehicle speakers. Further, the user may sign up for notifications when new tasks come available. The notifications may be based on a geographic or time-of-day preference or other preferences of the user, for example, a user may accept a task such as identifying all the signs in a particular neighborhood or at a particular intersection. Such identification may be effected through one or more vehicle inquiries, for example.

As stated above, whether the inquiry generation module 130 generates an inquiry for the user to answer may be based on a confidence level of the object or event detected in the environment. For example, if a detected object or event has a high confidence level associated therewith (e.g., above a threshold), user feedback may not be required to identify the object or event. Thus, no vehicle inquiry may be presented with respect to the detected object. Conversely, if a confidence level is low (e.g., below a threshold), successful classification of an object or event may require feedback in response to one or more vehicle inquiries. In some embodiments, the autonomous vehicle control system 100 may store information about one or more objects or events for a long period of time and until the object or event has been successfully classified and periodically generate vehicle inquiries until the object or event has been successfully classified. In some embodiments, the vehicle inquiry generated may be dependent upon a confidence level threshold. Confidence thresholds are not limited by this disclosure. Non-limiting examples of threshold confidence levels include 20%, 40%, 50%, 60%, 80%, and 100%.

As another non-limiting example, vehicle inquiries may be selected using a confidence level range ranging from a minimum confidence level (e.g., 0) to a maximum confidence level (e.g., 100). The confidence level range may be sub-divided into a plurality of increments, such as, for example quartiles. It is contemplated that any number of increments may be provided. As an example and not a limitation, confidence levels within a bottom quartile range from 0 to 25, confidence levels within a lower quartile range from 26 to 50, confidence levels within an upper quartile range from 51 to 75, and confidence levels within a highest quartile range from 76 to 100.

Each quartile may have one or more auditory descriptions or other vehicle inquiries associated therewith. Vehicle inquiries in the bottom quartile may represent less of a degree of certainty with respect to the classification of the detected object than the vehicle inquiries in the lower, upper, and highest quartile and so on. As an example and not a limitation, vehicle inquiries associated with the bottom or lower quartile may include "not sure," and "I think," and vehicle inquiries associated with the highest quartile may include "I am sure," and "I am positive," as non-limiting examples. It should be understood that many auditory, visual, or other descriptions are possible.

In some instances, the autonomous vehicle control system 100 may not be able to achieve a given confidence level after several attempts to identify an object or event in the environment. In such instances, it may be useful for the autonomous vehicle control system 100 may present one or more users of the vehicle 10 with a vehicle inquiry to increase the confidence level above the given value. For example, an object or event, such as, for example, a school bus, may be identified with a confidence level of 70%. In such a case, the inquiry generation module 130 may present a vehicle inquiry to one or more users of the vehicle in order to have the one or more users confirm the identification of the object and thereby increase the confidence level of the school bus. For example, the vehicle inquiry may ask, "Was that a school bus?" Because, in this example the detected object is in fact a school bus, the user will affirm the classification of the object. The user may or may not be incentivized to confirm the classification. In any event, the user's feedback may be stored, along with an image or other captured sensor data associated with the school bus (for example, an on-board audio recorder may capture a sound associated with the school bus, or the speed and acceleration profiles of the school bus may be captured) in order to improve the confidence level for similar school buses in the future. Conversely, the data may be stored to help identify other objects or events as not being school buses.

FIG. 2 depicts the vehicle 10 encountering an event after which the autonomous vehicle control system 100 may pose one or more vehicle inquiries to the users of the vehicle 10 to increase the functionality of the vehicle 10. In the non-limiting scenario depicted in FIG. 2, the vehicle 10 is surrounded by several target vehicles 12a-12d. Target vehicle 12a has changed lanes from the left lane into the center lane and slowed down, decreasing the distance between the vehicle 10 and the target vehicle 12a. Now, the vehicle 10 and the target vehicles 12a-12d are driving equal speeds along the road such that the relative distance between each vehicle is static. The target vehicles 12a-12d may be detected by the observation sensors 110 and data about the event may be processed by the processors 102 for developing one or more vehicle inquiries to pose to the users of the vehicle 10.

In one example, the autonomous vehicle control system 100 may cause the vehicle 10 to slow down until it is further away from the target vehicle 12a, increasing the following distance between the target vehicle 12a and the vehicle 10. After slowing and allowing the target vehicle 12a more room in front of the vehicle 10, the autonomous vehicle control system 100 may pose an inquiry such as, "Did I slow to an acceptable distance behind the vehicle in front of us?" Further, the vehicle 10 may pose vehicle inquiries such as, "Would you like me to slow to the same distance in the future?" referring to the distance between the vehicle 10 and the target vehicle 12a using the first-person plural. The user may provide user feedback to each of the vehicle inquiry. For example, the user may reply, "Yes."

The autonomous vehicle control system 100 may aggregate the sensor data, including data regarding the external environment (for example, the scenario described above) and regarding the performance of the vehicle (for example, speed and acceleration characteristics), with the feedback to the vehicle inquiry and distribute this aggregate data to one or more remote computing devices, for example a cloud computing device. Thus, aggregated data may be collected across a plurality of many autonomous vehicles to learn driver preferences and increase autonomous vehicle operations. The aggregated sensor data associated with the user-verified feedback may provide valuable information to one or more machine learning algorithms used to classify objects and/or events, for example. Because a user may verify the classification of an object, the data surrounding the feedback may be analyzed and used to improve models for predicting such an object in the future. Thus, the human-in-the-loop methods described herein may improve the autonomous functionalities of vehicles.

Additionally, the vehicle 10 may pose vehicle inquiries to the users of the vehicle 10 regarding objects in the surrounding environment 140. For example, the observation sensors 110 may detect an extinguished brake light on the target vehicle 12c. The object or event recognition software may determine that the target vehicle 12c has an extinguished brake light with a low confidence level and generate one or more vehicle inquiries to pose to the user of the vehicle 10. For example, the autonomous vehicle control system may pose a question such as, "Is the brake light extinguished on the vehicle to our front right?" The user may or may not reply. If the user offers an answer, the autonomous vehicle control system may use the answer to affect one or more operating criteria of the vehicle, such as decreasing speed to increase the distance between the vehicle 10 and the target vehicle 12c. Correspondingly, the autonomous vehicle control system 100 may take particular actions and then ask questions directly about whether the changes to the manner of driving are preferred, for example, the autonomous vehicle control system 100 may ask, "Do you like that I slowed down to increase the distance between us and the vehicle to our front right because of the extinguished brake light?" The user then has an opportunity to answer the questions and the feedback and sensor data may be aggregated as discussed above.

Figure 3:
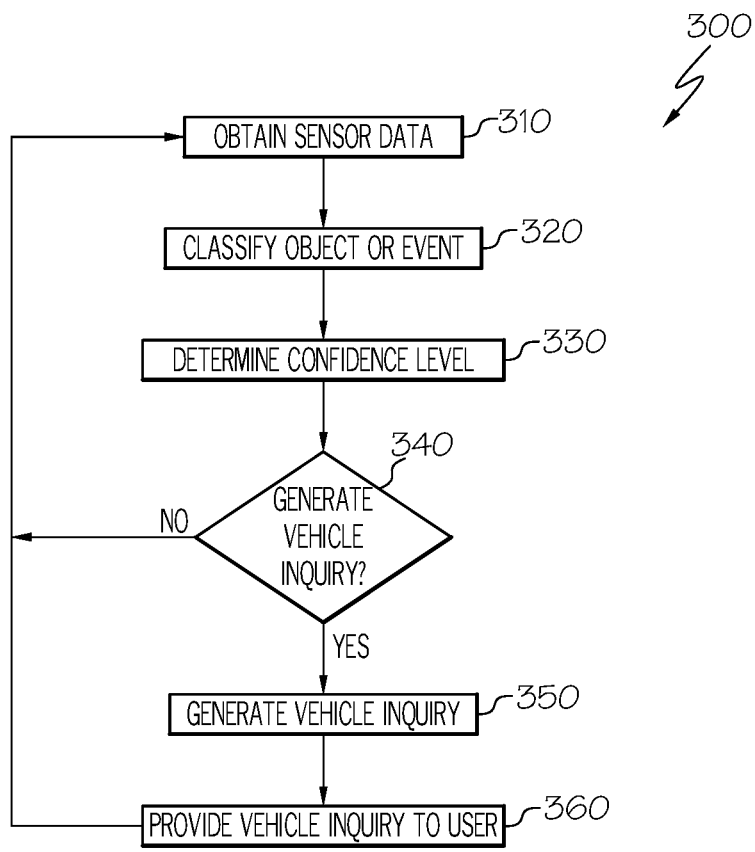
FIG. 3 depicts a process for presenting a vehicle inquiry based on obtained sensor data to one or more users of the vehicle of FIG. 2, according to one or more embodiments shown and described herein.

FIG. 3 depicts a process of detecting objects or events within the surrounding environment and providing vehicle inquiries to the users of an autonomous vehicle, such as the vehicle 10 shown in the surrounding environment 140 in FIG. 2. As the vehicle 10 encounters the surrounding environment 140, the observation sensors 110 obtain sensor data at block 310. The sensor data may be in the form of one or more static digital images, video images, sound recordings, radar, lidar, or sonar detections, or any other detection possible by the one or more observation sensors 110. The sensor data may be stored in the non-transitory memory modules 106 and/or transferred to the network 105, for example. At block 320, the processors 102 access the sensor data and, in accordance with the object or event recognition logic, perform one or more object or event recognition algorithms on the sensor data. The object or event recognition logic detects one or more objects or events within the sensor data representing the surrounding environment 140. The classification of the object or event is determined as a result of the object or event recognition process. The classification represents the type of object or event that is detected. For example, lidar data representing the surrounding environment 140 shown in FIG. 2 may include four target vehicles 12a-12d.

As described above, object or event recognition algorithms are not one hundred percent accurate and may misclassify objects or events for a variety of reasons. Object or event recognition algorithms of the present disclosure produce a confidence level with respect to the objects or events that are detected from the image data at block 330. As stated above, the confidence level corresponds with a confidence that the object or event has been accurately classified.

For example, the autonomous vehicle control system 100 may include one or more algorithms that determine whether or not to generate a vehicle inquiry based on the confidence level of a detected object or event. For example, at block 340, if the confidence level associated with a detected object is too low, there may be no vehicle inquiry that could be useful to help confirm the identity of the object. Conversely, if the confidence level of a detected object is above a threshold level, the object may already be determined and no vehicle inquiry may be necessary. If it is determined that a vehicle inquiry may be useful to affect the confidence level associated with a particular detected object or event, though, a vehicle inquiry may be generated and presented to one or more users.

At block 350, the processor 102 generates a vehicle inquiry that includes at least an assumed classification of the detected object and a request for confirming the assumed classification. At block 360, the vehicle inquiry is presented to the user in visual, auditory, or haptic form.

In one embodiment, any auditory signal produced by the processor 102 may be generated by any known or yet-to-be-developed computer speech synthesis processes. In some embodiments, the auditory signal produces an auditory message that is conversational in nature (i.e., in a complete sentence). For example, an auditory signal provided to the audio device 150 may state: "I am 40% sure that there is a target vehicle in front of you. Can you confirm the object?" Accordingly, the auditory message includes both the classification of the object (e.g., "target vehicle") and an auditory representation of the confidence level (e.g., "40% sure"). In other examples, the vehicle inquiry may be presented on a visual display within the vehicle 10 or may be sent to a user's personal electronic device.

In some embodiments, the vehicle inquiries produced at block 350 do not recite an actual percentage of confidence but rather qualify the classification of the object detected by the observation sensors 110 in other ways. As a non-limiting example, the vehicle inquiries may qualify the classification by use of words and phrases such as "not sure," "I think," "pretty sure," "fairly certain," "sure," and the like. For example, the vehicle inquiry may recite, "I think that there is another vehicle passing on the right, is this correct?" if the confidence level is low. In other cases, the vehicle inquiry may recite, "There is another vehicle passing on the right, correct?" when the confidence level is high. By presenting vehicle inquiries to the user, a response useful for improving the functionality of the vehicle 10 from the user is more likely. Thus, the autonomous functionality of the vehicle 10 is likely to improve.

The processor 102 may also incorporate directional information into the vehicle inquiry, such as how many degrees to left and right or with respect to other position information, for example. Distance information may also be provided (e.g., "I am fairly certain that there is a target vehicle half a kilometer from you and in the left lane. Is this correct?").

As stated above, in some embodiments, the autonomous vehicle control system 100 may learn the preferences of the users based on the user feedback provided. The autonomous vehicle control system 100 may then adjust how and/or what type of vehicle inquiries to present to the various users of the vehicle 10. Additionally, user feedback may be used in storing sensor data that is used by the object or event recognition algorithm in classifying detected objects or events, as described in more detail below.

Figure 4:
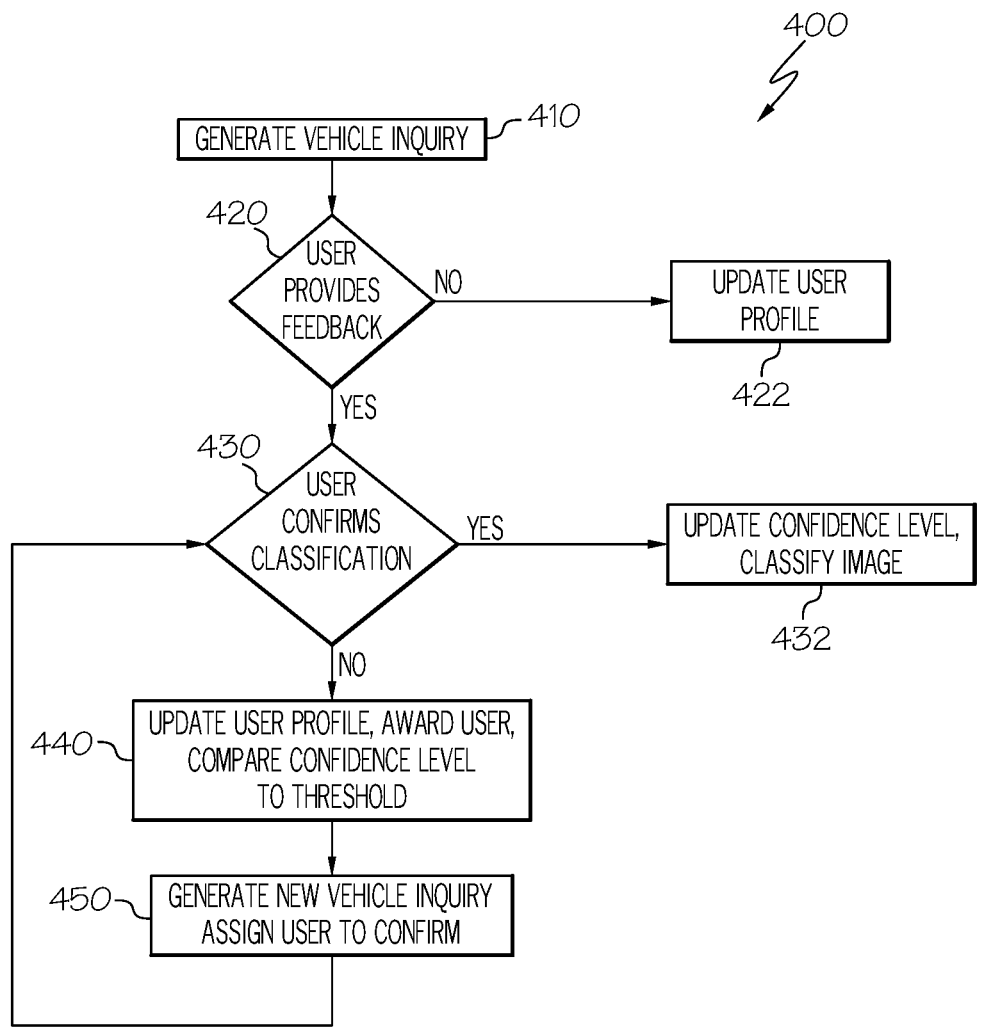
FIG. 4 depicts a process for incentivizing user feedback to one or more vehicle inquiries, according to one or more embodiments shown and described herein.

Referring to the flowchart 400 of FIG. 4, the autonomous vehicle control system 100 generates a vehicle inquiry at block 410. The user may or may not provide feedback to the vehicle inquiry at block 420. If the user does not provide feedback the autonomous vehicle control system 100 may update the user profile of the particular user, for example, store data regarding the lack of feedback. The autonomous vehicle control system 100 may be less likely to present a vehicle inquiry to this user in the future, may increase incentives to this user in order to provide feedback, or may take some other action regarding this particular user.

The user feedback may be provided by one or more feedback devices 115 at block 430. The user feedback may or may not confirm the classification of the object or event in the surrounding environment. If the feedback confirms the classification, the autonomous vehicle control system 100 may update the confidence level of the object or event in the surrounding environment and positively classify the object or event at block 422. If the user provides feedback but the feedback does not raise the confidence level above the threshold level, the autonomous vehicle control system 100 may update the user's profile and/or award the user at block 440 for having provided feedback and continue to try to confirm the classification of the object or event.

For example, the autonomous vehicle control system may compare the current confidence level of the object or event to the threshold level to determine a new vehicle inquiry to present to the user of the vehicle as described above. Based on the comparison between the confidence level and the threshold level, the autonomous vehicle control system 100 may generate a new vehicle inquiry and provide it to the user as described above at block 450. This process may continue until the confidence level is above the threshold level or the user decides to no longer answer the one or more vehicle inquiries. The user profile and preferences may be updated with each new inquiry. Additionally, information regarding the object or event classification may be sent to an external network or cloud network such as the network 105 and used by other systems and vehicles to recognize objects or events. In some embodiments, a certain threshold number of questions may be asked. For example, the user may set a limit of three questions for any detected object and/or event.

Figure 5:
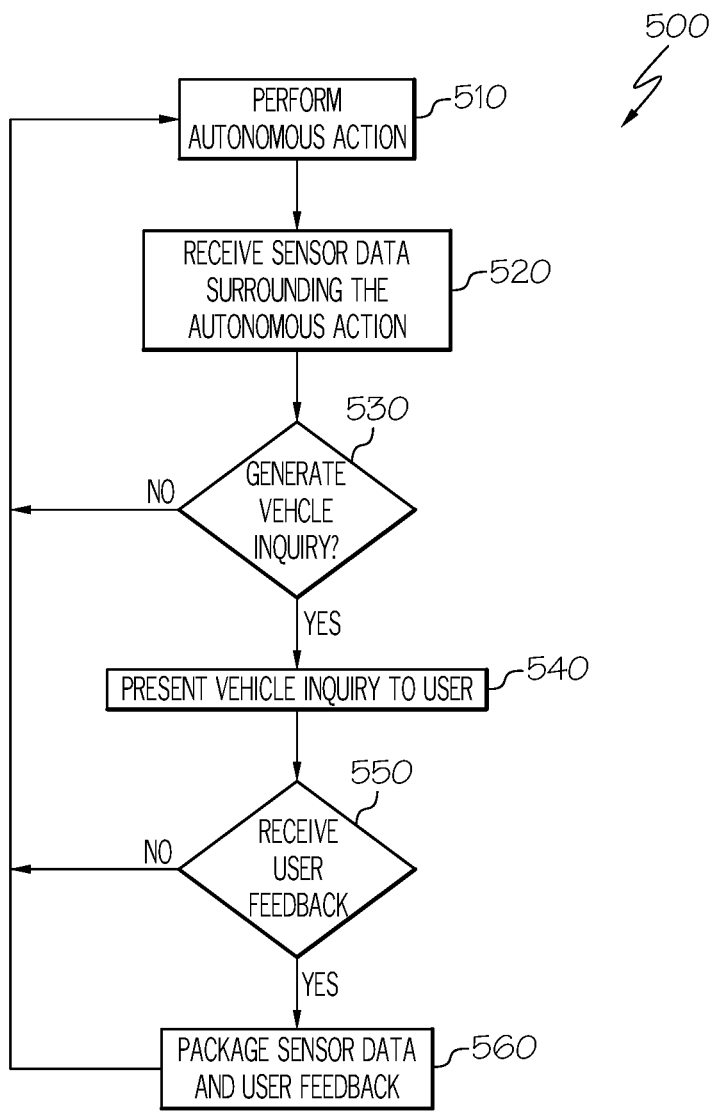
FIG. 5 depicts a process for packaging sensor data, measured performance data, and user feedback, according to one or more embodiments shown and described herein.

Referring now to FIG. 5, an example method 500 of controlling a vehicle by presenting and receiving feedback regarding an autonomous action of the vehicle is illustrated. At block 501, the autonomous vehicle control system 100 controls the vehicle 10 to perform an autonomous action, such as an autonomous maneuver. The autonomous action may be any action by the vehicle 10 that does not rely on human control. Example autonomous actions include, but are not limited to, passing a vehicle, changing lanes, making a turn, keeping in a lane, changing speeds, merging onto a highway, and the like.

While the vehicle 10 performs the autonomous action, sensor data from the plurality of observation sensors 110 is recorded. For example, sensor data from the proximity sensors, cameras, laser scanners, capacitive displacement sensors, Doppler Effect sensors, eddy-current sensors, ultrasonic sensors, magnetic sensors, optical sensors, radar sensors, sonar sensors, lidar sensors, vibration sensors, or combinations thereof may be recorded. The sensor data characterizes the autonomous action performed by the vehicle 10, such as speed, direction, acceleration, position on road, or any other metric or characteristic. At block 530, it is determined whether or not to generate a vehicle inquiry regarding the recently performed autonomous action. The decision as to whether or not to generate a vehicle inquiry may depend on a variety of factors, none of which are limited by the present disclosure. For example, the autonomous vehicle control system 100 may deem it desirable to collect more feedback and/or data for certain autonomous actions (e.g., there may be an identified need for more feedback and/or data regarding certain autonomous actions, the autonomous vehicle control system 100 may be instructed by one or more human administrators to collect more feedback and/or data for certain autonomous actions, or additional feedback and/or data may be collected periodically for certain autonomous actions to keep data current). For whatever the reason, if it is not decided to generate a vehicle inquiry at block 530, the process may return to 510 depending on the current state of the vehicle 10.

For whatever the reason, if it is decided to generate a vehicle inquiry at block 530, the process moves to block 540 where the vehicle inquiry is generated and presented. The user may then proffer feedback in response to the vehicle query. If it is determined that no user feedback was provided at block 550, then the process may return to block 510 depending on the state of the vehicle 10. If it is determined that feedback was received at block 550, then the process moves to block 560, wherein the sensor data based on the autonomous action is packaged or otherwise associated with the user feedback. This packaged information may then be used by the autonomous vehicle control system 100 (or one or more remote computing devices) to evaluate the autonomous action for future use. As an example and not a limitation, the user feedback and the associated sensor data of the autonomous action may be used to determine preferences of the user. Machine learning may be used to determine patterns within the sensor data to learn specific preferences of the user (e.g., speed at which the user would like the vehicle to pass another vehicle, whether or not the user would like the vehicle 10 to pass another vehicle, the speed at which the vehicle merges into traffic, and the like).

It should now be understood that embodiments described herein are directed to increasing the amount and quality of feedback to vehicle inquiries posed by an autonomous vehicle control system from users and to associating sensor data with that feedback in order to improve the autonomous functionality of the vehicle. The vehicle inquiries may be generated to identify objects or events detected in the surrounding environment by one or more vehicle sensors and feedback to the vehicle inquiries may be incentivized through a marketplace of tasks with varying levels and types of remuneration. Further, the sensor data and associated response may be aggregated across a plurality of autonomous vehicles to inform user preferences, allowing the manufacturers of autonomous vehicles to more accurately classify objects and events across a network of autonomous vehicles and to better understand how and when user input may improve autonomous performance to accelerate machine learning, thereby enabling greater vehicle autonomy.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of collecting data regarding the operation of a vehicle, the method comprising:
   receiving sensor data regarding one or more objects or events in a surrounding environment using one or more vehicle sensors;
   classifying, by one or more processors, the one or more detected objects or events;
   generating a plurality of vehicle inquiries based on the classification of the one or more detected objects or events;
   generating one or more confidence levels associated with the one or more objects or events;
   presenting one or more vehicle inquiries of the plurality of vehicle inquiries based on the one or more confidence levels;
   receiving user feedback to the one or more vehicle inquiries;
   after receiving the user feedback to a vehicle inquiry, generating a new vehicle inquiry when the confidence level is below a threshold level; and
   performing an autonomous action based at least in part on the detected object or event, wherein the plurality of vehicle inquiries is directed to a performance of the autonomous action.

2. The method of claim 1, wherein the sensor data further comprises measured performance data.

3. The method of claim 2, further comprising associating sensor data generated within a time window of the user feedback with the user feedback.

4. The method of claim 1, further comprising issuing one or more incentives in response to receiving the user feedback to the one or more vehicle inquiries.

5. The method of claim 1, further comprising generating a total number of vehicle inquiries based on the confidence level.

6. The method of claim 1, further comprising providing an incentive to answer the one or more vehicle inquiries.

7. The method of claim 1, wherein a total number of vehicle inquiries generated is based upon a user preference.

8. The method of claim 1, further comprising transmitting the sensor data and user feedback from the vehicle to an external network.

9. An autonomous vehicle control system comprising:
   one or more processors;
   one or more non-transitory memory modules communicatively coupled to the one or more processors;
   one or more vehicle sensors;
   one or more feedback devices;
   machine readable instructions stored in the one or more non-transitory memory modules that cause the autonomous vehicle control system to perform at least the following when executed by the one or more processors:
      detect one or more objects or events in a surrounding environment using sensor data from one or more vehicle sensors,
      classify the one or more detected objects or events,
      generate a plurality of vehicle inquiries based on the classification of the one or more detected objects or events, generate one or more confidence levels associated with the one or more objects or events, present one or more vehicle inquiries of the plurality of vehicle inquiries based on the one or more confidence levels using the one or more feedback devices, receive user feedback to the one or more vehicle inquiries of the plurality of vehicle inquiries using the one or more feedback devices; and after receiving the user feedback to a vehicle inquiry, generate a new vehicle inquiry when the confidence level is below a threshold level.

10. The autonomous vehicle control system of claim 9, wherein the machine readable instructions stored in the one or more non-transitory memory modules further cause the autonomous vehicle control system to aggregate one or more data packets based on the sensor data and the user feedback.

11. The autonomous vehicle control system of claim 9, wherein the machine readable instructions stored in the one or more non-transitory memory modules further cause the autonomous vehicle system to, after receiving the user feedback to the one or more vehicle inquiries, issue one or more incentives when the confidence level is below a threshold level.

12. The autonomous vehicle control system of claim 9, wherein the machine readable instructions further cause the autonomous vehicle control system to control the vehicle to perform an autonomous action, and the one or more vehicle inquiries are directed to a performance of the autonomous action.

13. A method of controlling a vehicle comprising:
controlling the vehicle, using one or more processors, to perform an autonomous action;
receiving sensor data from one or more vehicle sensors regarding the autonomous action;
developing a plurality of vehicle inquiries based on the autonomous action and the sensor data regarding the autonomous action;
generating one or more confidence levels associated with the one or more objects or events;
presenting one or more vehicle inquiries of the plurality of vehicle inquiries based on the one or more confidence levels;
receiving user feedback to the one or more vehicle inquiries; and
after receiving the user feedback to a vehicle inquiry, generating a new vehicle inquiry when the confidence level is below a threshold level.

14. The method of claim 13, further comprising aggregating the sensor data and the user feedback into one or more data packets.

15. The method of claim 13, further comprising issuing one or more incentives to the users of the vehicle for providing feedback to the vehicle inquiry.

* * * * *